United States Patent
Endo et al.

(10) Patent No.: US 9,112,209 B2
(45) Date of Patent: Aug. 18, 2015

(54) POSITIVE ELECTRODE FOR NON-AQUEOUS ELECTROLYTE SECONDARY BATTERIES AND NON-AQUEOUS ELECTROLYTE SECONDARY BATTERY

(75) Inventors: Kazuki Endo, Osaka (JP); Masato Fujikawa, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 255 days.

(21) Appl. No.: 13/383,791

(22) PCT Filed: Mar. 18, 2011

(86) PCT No.: PCT/JP2011/001638
§ 371 (c)(1),
(2), (4) Date: Jan. 12, 2012

(87) PCT Pub. No.: WO2011/148550
PCT Pub. Date: Dec. 1, 2011

(65) Prior Publication Data
US 2012/0121955 A1 May 17, 2012

(30) Foreign Application Priority Data
May 28, 2010 (JP) .................................. 2010-123016

(51) Int. Cl.
*H01M 4/131* (2010.01)
*H01M 4/62* (2006.01)
(Continued)

(52) U.S. Cl.
CPC ............. *H01M 4/131* (2013.01); *H01M 4/621* (2013.01); *H01M 10/0525* (2013.01); *H01M 10/0587* (2013.01); *Y02E 60/122* (2013.01)

(58) Field of Classification Search
CPC ..................... H01M 10/0525; H01M 10/0587; H01M 4/131; H01M 4/621; Y02E 60/122
USPC ......................................... 429/220, 94, 231.1
See application file for complete search history.

(56) References Cited

U.S. PATENT DOCUMENTS

2002/0037450 A1   3/2002 Suzuki et al.
2003/0068551 A1   4/2003 Fukunaga et al.
(Continued)

FOREIGN PATENT DOCUMENTS

CN   1337756 A   2/2002
CN   1402365 A   3/2003
(Continued)

OTHER PUBLICATIONS
English translation of JP 11-265708, Yanase, Sep. 1999.*
(Continued)

*Primary Examiner* — Jonathan Jelsma
*Assistant Examiner* — Rashid Alam
(74) *Attorney, Agent, or Firm* — McDermott Will & Emery LLP

(57) ABSTRACT

Disclosed is a positive electrode for non-aqueous electrolyte secondary batteries, the positive electrode including a positive electrode material mixture layer which includes positive electrode active material particles and a binder. A curve representing a correlation between a distance from a current collector in the thickness direction of the positive electrode material mixture layer and an amount of the binder has a first maximum point, a minimum point, and a second maximum point. The minimum point corresponds to a position in a center area of the positive electrode material mixture layer in a thickness direction thereof, and the first and second maximum points correspond to a position nearer the current collector and a position further away from the current collector than the position corresponding to the minimum point, respectively. A ratio $W_1/W_2$ of an amount $W_1$ at the first maximum point to an amount $W_2$ at the minimum point of the binder per 100 parts by weight of the positive electrode active material particles is greater than 2.

9 Claims, 2 Drawing Sheets

(51) Int. Cl.
   *H01M 10/0525* (2010.01)
   *H01M 10/0587* (2010.01)

(56) References Cited

U.S. PATENT DOCUMENTS

| | | |
|---|---|---|
| 2003/0134190 A1 | 7/2003 | Ishida et al. |
| 2004/0234850 A1 | 11/2004 | Watarai et al. |
| 2009/0017381 A1 | 1/2009 | Saruwatari et al. |
| 2009/0117463 A1* | 5/2009 | Takezawa et al. ............ 429/220 |
| 2009/0233177 A1 | 9/2009 | Fujita et al. |
| 2009/0325075 A1* | 12/2009 | Tsuchiya et al. ............. 429/232 |
| 2010/0285356 A1* | 11/2010 | Choi et al. .................... 429/209 |

FOREIGN PATENT DOCUMENTS

| | | |
|---|---|---|
| CN | 1406403 A | 3/2003 |
| CN | 1529917 A | 9/2004 |
| CN | 101341610 A | 1/2009 |
| CN | 101345301 A | 1/2009 |
| CN | 101359748 A | 2/2009 |
| JP | 09-075865 | 3/1997 |
| JP | 10-270013 | 10/1998 |
| JP | 11-265708 A | 9/1999 |
| JP | 11265708 A * | 9/1999 |
| JP | 11-339772 | 12/1999 |
| JP | 2001-150830 | 6/2001 |
| JP | 2001-345096 | 12/2001 |
| JP | 2002-343340 | 11/2002 |
| JP | 2006-267631 | 10/2006 |
| JP | 2008-059876 | 3/2008 |
| JP | 2008-091054 | 4/2008 |

OTHER PUBLICATIONS

International Search Report issued in International Patent Application No. PCT/JP2011/001638, mailed Jun. 28, 2011.
Chinese Office Action issued in Chinese Application 201180002952.1 dated Jun. 19, 2014, w/Partial English translation.
Chinese Office Action and Search Report issued in the corresponding Chinese Patent Application No. 201180002952.1, mailed Nov. 4, 2013.
Chinese Office Action issued in the corresponding Chinese Patent Application No. 201180002952.1, mailed Dec. 15, 2014 (W/ partial English translation).

* cited by examiner

F I G. 1
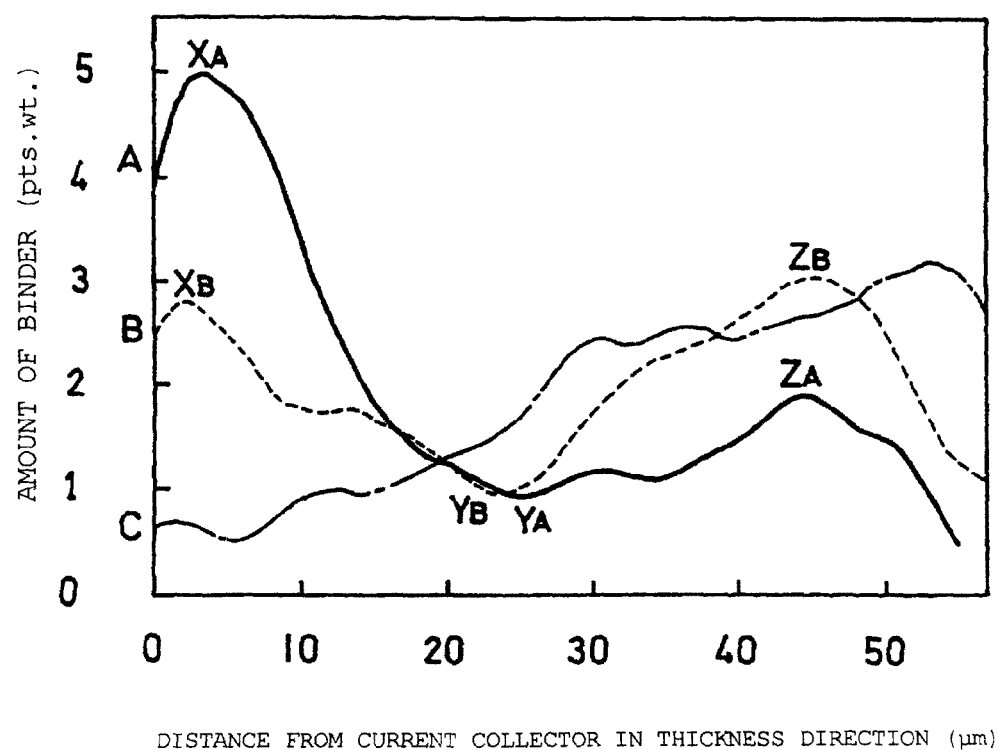

ative electrode material mixture layer formed on a surface of the current collector. The positive electrode material mixture layer includes positive electrode active material particles and a binder. A curve representing a correlation between a distance from the current collector in a thickness direction of the positive electrode material mixture layer and an amount of the binder in the positive electrode material mixture layer has a

POSITIVE ELECTRODE FOR NON-AQUEOUS ELECTROLYTE SECONDARY BATTERIES AND NON-AQUEOUS ELECTROLYTE SECONDARY BATTERY

RELATED APPLICATIONS

This application is the U.S. National Phase under 35 U.S.C. §371 of International Application No. PCT/JP2011/001638, filed on Mar. 18, 2011, which in turn claims the benefit of Japanese Application No. 2010-123016, filed on May 28, 2010, the disclosures of which Applications are incorporated by reference herein.

TECHNICAL FIELD

The present invention relates to a positive electrode for non-aqueous electrolyte secondary batteries, the positive electrode including a current collector and a positive electrode material mixture layer formed on a surface thereof. More specifically, the present invention relates to improvement of a positive electrode material mixture layer.

BACKGROUND ART

In recent years, with reduction in size and weight of electronic devices such as cellular phones and notebook personal computers, secondary batteries used as power sources for these devices are required to have higher capacities. In response to such a requirement, non-aqueous electrolyte secondary batteries, which have the potential for higher energy densities, are widely used. A non-aqueous electrolyte secondary battery includes a positive electrode, a negative electrode, a separator interposed therebetween, and a non-aqueous electrolyte. The positive electrode, the negative electrode, and the separator are wound together, forming an electrode group.

The positive electrode includes a current collector, and a positive electrode material mixture layer formed on a surface of the current collector. The positive electrode material mixture layer includes positive electrode active material particles, a binder, and, if necessary, a conductive material. A lithium-containing transition metal oxide, such as $LiCoO_2$, $LiNiO_2$, $LiNi_{1-x1}Co_{x1}O_2$, where $0<x1<1$ is used as the positive electrode active material.

In order to achieve a higher capacity of non-aqueous electrolyte secondary batteries, it has been studied to densely pack positive electrode active material particles in the positive electrode material mixture layer, thereby to increase the active material density. However, in winding a positive electrode in which the active material density is high, breakage of the positive electrode such as rupture of the current collector or chipping and cracks in the positive electrode material mixture layer occurs easily due to the stress of winding. Therefore, suppression of such breakage of the positive electrode has been studied.

Patent Literature 1 proposes that the electrode material mixture layer be provided with recesses at predetermined intervals, thereby to divide it into a plurality of regions. Patent Literature 1 discloses that this makes it possible to curve the electrode to a great extent without causing breakage.

Patent Literature 2 proposes that the electrode material mixture layer and the current collector be allowed to separate from each other easily at the interface therebetween. It is disclosed that the stress of winding causes a slight separation at the interface, and as a result, the breakage of the electrode can be prevented. Patent Literature 2 further proposes that the peeling strength at the interface between the current collector and one of the electrode material mixture layers which is provided on the inner side of the current collector be set smaller than that between the current collector and the other one of the electrode material mixture layers.

Patent Literature 3 proposes that the binder be included in the electrode material mixture layer such that the concentration of the binder in an area around the center is 50 to 90% of that in an area near the current collector. Patent Literature 3 discloses that this can decrease the amount of the binder, without impairing the adhesion between the current collector and the electrode material mixture, and thus can improve the charge/discharge characteristics.

CITATION LIST

Patent Literature

[PTL 1] Japanese Laid-Open Patent Publication No. 2002-343340
[PTL 2] Japanese Laid-Open Patent Publication No. 2008-91054
[PTL 3] Japanese Laid-Open Patent Publication No. Hei 10-270013

SUMMARY OF INVENTION

Technical Problem

In Patent Literature 1, because of the absence of the active material in the recesses, the amount of active material contained in the electrode is small. This poses a limitation in achieving a higher capacity of non-aqueous electrolyte secondary batteries.

In Patent Literature 2, because of easy separation of the electrode material mixture layer from the current collector, the current-collecting ability tends to deteriorate.

In Patent Literature 3, the concentration of the binder in the area around the center of the electrode material mixture layer is small. It is considered, therefore, that the stress is likely to be reduced, and the breakage of the positive electrode is suppressed to some extent. However, when the active material density is increased to 3.3 g/cm³ or more, it becomes difficult to reduce the stress. This is presumably because in the electrode material mixture layer with high density, even if the concentration of the binder in the area around the center is reduced to 50% of that in the area near the current collector, the binder is still contained in excess, and the adhesion between active material particles is too high.

The higher the active material density is, the more severely the positive electrode is broken due to the stress of winding. As such, it has been difficult to realize, in a balanced manner, achievement of a higher capacity of the battery, and suppression of the deterioration in current-collecting ability and the breakage of the positive electrode.

Solution to Problem

One aspect of the present invention relates to a positive electrode for non-aqueous electrolyte secondary batteries, the positive electrode including a current collector and a positive electrode material mixture layer formed on a surface of the current collector. The positive electrode material mixture layer includes positive electrode active material particles and a binder. A curve representing a correlation between a distance from the current collector in a thickness direction of the positive electrode material mixture layer and an amount of the binder in the positive electrode material mixture layer has a first maximum point, a minimum point, and a second maximum point. The minimum point corresponds to a position in a center area of the positive electrode material mixture layer in the thickness direction thereof, the first maximum point corresponds to a position nearer the current collector than the position corresponding to the minimum point in the positive electrode material mixture layer, and the second maximum point corresponds to a position further away from the current collector than the position corresponding to the minimum point in the positive electrode material mixture layer. A ratio $W_1/W_2$ of an amount $W_1$ of the binder per 100 parts by weight of the positive electrode active material particles at the first maximum point to an amount $W_2$ of the binder per 100 parts by weight of the positive electrode active material particles at the minimum point is greater than 2. The $W_1$ is 1 to 8 parts by weight, and the $W_2$ is 0.3 to 1.5 parts by weight. The positive electrode active material particles include a lithium-containing transition metal oxide. The positive electrode material mixture layer has an active material density of 3.3 to 4 g/cm$^3$.

Another aspect of the present invention relates to a non-aqueous electrolyte secondary battery including: the above positive electrode; a negative electrode; a separator interposed between the positive electrode and the negative electrode; and a non-aqueous electrolyte, the positive electrode, the negative electrode, and the separator being wound together, forming an electrode group.

Advantageous Effects of Invention

The positive electrode for non-aqueous electrolyte secondary batteries according to the present invention, despite of its high density, is unlikely to break even if stress is generated by winding during formation of an electrode group. This eases the production of non-aqueous electrolyte secondary batteries.

While the novel features of the invention are set forth particularly in the appended claims, the invention, both as to organization and content, will be better understood and appreciated, along with other objects and features thereof, from the following detailed description taken in conjunction with the drawings.

BRIEF DESCRIPTION OF DRAWINGS

FIG. 1 Graphs showing a correlation between the distance from the current collector in the thickness direction of the positive electrode material mixture layer and the amount of binder in the positive electrode material mixture layer, according to one embodiment of the present invention.

DESCRIPTION OF EMBODIMENT

Figure 2:
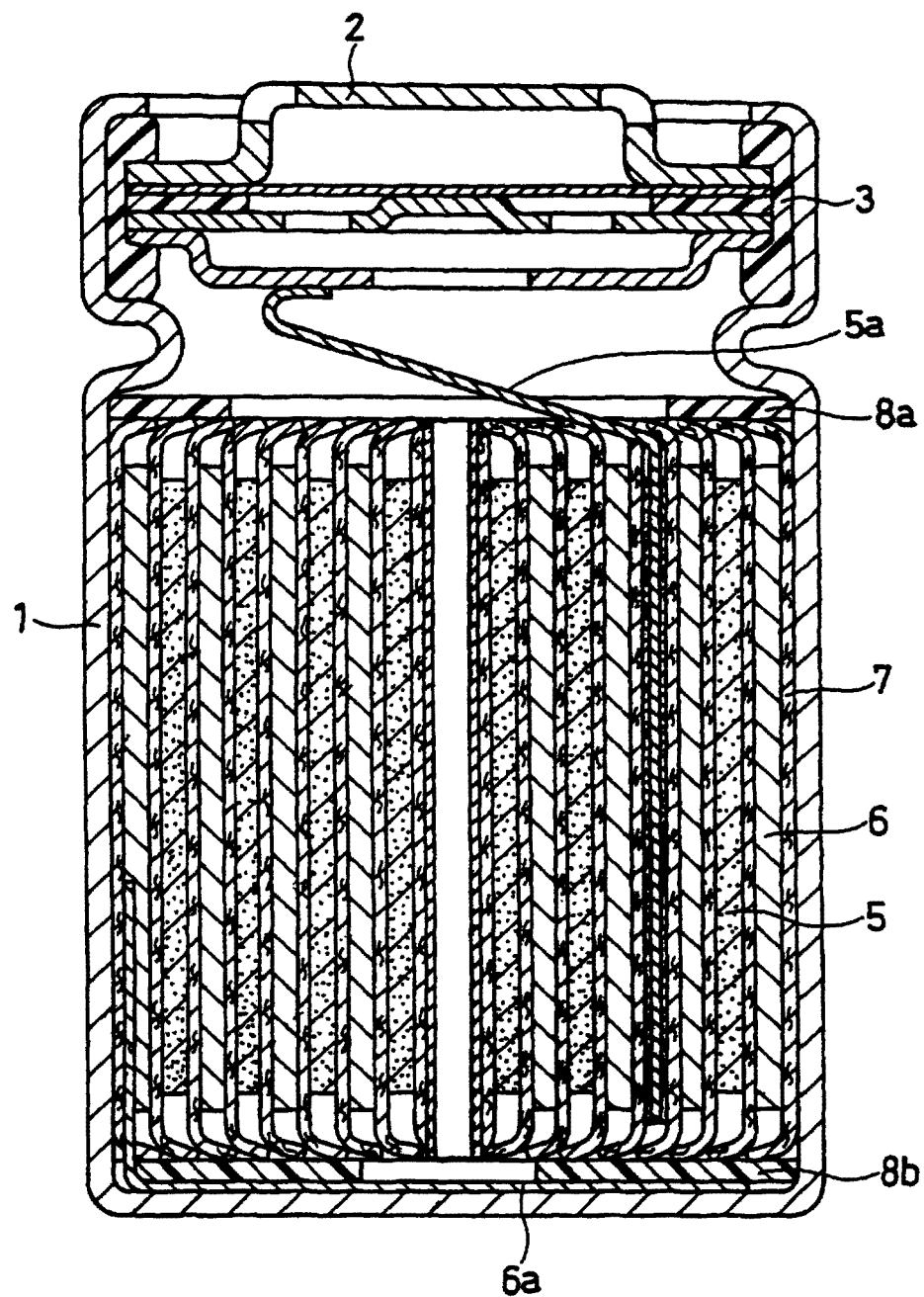
FIG. 2 A longitudinal cross-sectional view schematically showing the configuration of a non-aqueous electrolyte secondary battery according to the present invention.

The positive electrode for non-aqueous electrolyte secondary batteries (hereinafter sometimes simply referred to as the "positive electrode") includes a sheet-like current collector, and a positive electrode material mixture layer formed on a surface of the current collector. The positive electrode material mixture layer includes positive electrode active material particles, and a binder as an essential component, and further includes, for example, a conductive material as an optional component. The positive electrode material mixture layer is formed on at least one surface of the current collector, and may be formed on both surfaces thereof.

The positive electrode produced by, for example, the following method. Positive electrode active material particles, a binder, and a dispersion medium are mixed together, to prepare a positive electrode material mixture slurry. An optional component may be added to the positive electrode material mixture slurry. The positive electrode material mixture slurry is applied onto a surface of the current collector, and dried, to give a positive electrode material mixture layer. The positive electrode material mixture layer is then rolled, whereby the active material density is enhanced, and thus, a positive electrode with high capacity can be obtained.

The binder included in the positive electrode material mixture slurry tends to migrate to an area near the surface of the positive electrode material mixture layer, in the process of, for example, drying the positive electrode material mixture slurry applied onto a surface of the current collector. If the migration of binder occurs, the weight content of the binder in the area near the current collector in the positive electrode material mixture layer is decreased. As a result, the positive electrode material mixture layer becomes easily separated from the current collector at the interface therebetween, and the current-collecting ability may deteriorate.

On the other hand, if the amount of the binder in the positive electrode material mixture layer is increased in order to prevent the separation of the positive electrode material mixture layer from the current collector, a higher capacity cannot be achieved, and the deterioration in current-collecting ability cannot be prevented.

In view of the above, in the present invention, the distribution of the binder in the positive electrode material mixture layer is controlled so that the deterioration in current-collecting ability and the breakage of the positive electrode can be effectively suppressed. FIG. 1 includes graphs showing a correlation between the distance from the current collector in the thickness direction of the positive electrode material mixture layers "a" to "c" and the amount of binder (i.e., a distribution of the binder). In the graph, the "amount of binder" is an average amount of the binder present on a plane at a position at a distance "d" from the current collector (i.e., from the interface between the positive electrode material mixture layer and the current collector) in the positive electrode material mixture layer, which is expressed as an amount (part(s) by weight) of the binder per 100 parts by weight of the positive electrode active material particles. This is substantially synonymous with an amount (part(s) by weight) of the binder per 100 parts by weight of the positive electrode active material particles in a very thin layer at a position at a distance "d". The amount (part(s) by weight) of the binder per 100 parts by weight of the positive electrode active material particles is sometimes simply referred to herein as "the weight content of the binder".

In all of the positive electrode material mixture layers "a" to "c", the positive electrode active material is LiCoO$_2$, and the binder is polyvinylidene fluoride (PVDF). N-methyl-2-pyrrolidone (NMP) is used as the dispersion medium in preparing a positive electrode material mixture slurry.

Curve A shows a distribution of the binder in the positive electrode material mixture layer "a". The positive electrode material mixture layer "a" includes a positive electrode active material and a binder. The positive electrode material mixture layer "a" is obtained by applying a first positive electrode material mixture slurry in which the weight content of the binder is 5 parts by weight onto a current collector, heating the current collector at 190° C. for 1 hour, and then applying a second positive electrode material mixture slurry in which the weight content of the binder is 0.9 part by weight.

Curve B shows a distribution of the binder in the positive electrode material mixture layer "b". The positive electrode material mixture layer "b" is obtained by applying a first positive electrode material mixture slurry in which the weight content of the binder is 5 parts by weight onto a current collector, and then applying a second positive electrode material mixture slurry in which the weight content of the binder is 0.7 part by weight.

Curve C shows a distribution of the binder in the positive electrode material mixture layer "c" obtained by applying a positive electrode material mixture slurry in which the weight content of the binder is 1.7 parts by weight onto a current collector.

Each positive electrode material mixture slurry is usually dried after application. Finally, the applied film thus dried is usually rolled.

As shown in curve C, the amount of binder is small in an area near the current collector in the positive electrode material mixture layer "c". Presumably, this is attributed to the migration of binder as mentioned above.

On the other hand, in the positive electrode material mixture layers "a" and "b" according to the present invention, curves A and B representing a correlation between the distance from the current collector in the thickness direction and the amount of binder have first maximum points $X_A$ and $X_B$ in an area near the current collector, respectively. Curves A and B further have minimum points $Y_A$ and $Y_B$ and second maximum points $Z_A$ and $Z_B$.

The position corresponding to the minimum point is in a center area of the positive electrode material mixture layer in the thickness direction thereof. The "center area" is an area excluding the areas near the current collector and near the surface in the positive electrode material mixture layer. When the thickness of the positive electrode material mixture layer is denoted as T, the "area near the current collector" and the "area near the surface" in the positive electrode material mixture layer as used herein refer to an area having a thickness of 0.3 T as measured from the current collector (i.e., from the interface between the current collector and the positive electrode material mixture layer), and an area having a thickness of 0.3 T as measured from the surface of the positive electrode material mixture layer, respectively.

In the positive electrode material mixture layer having such a distribution, the amount of binder in the center area is relatively small. When the stress is generated in the positive electrode during winding, the migration of particles tends to occur around a position where the amount of binder is relatively small and which corresponds to the minimum point, and as a result, gaps are formed between the particles, or the area near the current collector and the area near the surface are misaligned from each other. This allows the positive electrode material mixture layer to deform, making it possible to reduce the stress due to winding. As such, breakage of the positive electrode such as rupture of the current collector or chipping and cracks in the positive electrode material mixture layer can be suppressed.

The first maximum point corresponds to a position nearer the current collector than the position corresponding to the minimum point in the positive electrode material mixture layer. The positive electrode material mixture layer having such a distribution contains a relatively large amount of binder in the area near the current collector. As such, the area near the current collector in the positive electrode material mixture layer is bonded to the current collector with a sufficient bonding strength. As a result, the positive electrode material mixture layer is unlikely to be separated from the current collector, and thus, the deterioration in current-collecting ability can be suppressed.

In the present invention, the overall thickness of the positive electrode material mixture layer is preferably 20 to 150 μm, and more preferably 50 to 100 μm. The first maximum point preferably corresponds to a position at a distance of 0.1 to 10 μm from the current collector in the thickness direction of the positive electrode material mixture layer, and more preferably at a distance of 1 to 5 μm.

Here, a ratio $W_1/W_2$ of the amount $W_1$ of the binder per 100 parts by weight of the positive electrode active material particles at the first maximum point to the amount $W_2$ of the binder per 100 parts by weight of the positive electrode active material particles at the minimum point should be greater than 2. In a positive electrode that satisfies such a $W_1/W_2$, even if it has been rolled until the active material density becomes high, the amount of the binder around the position corresponding to the minimum point is relatively small, and hence, the adhesion between particles is not increased too much, making it possible to favorably suppress the breakage of the positive electrode when stress is generated due to winding. This acts synergically with that the position corresponding to the first maximum point is located in the area near the current collector, to allow the positive electrode material mixture layer to be less likely to separate from the current collector, and to more effectively suppress the deterioration in current-collecting ability. In order to more readily achieve such an effect, the $W_1/W_2$ is greater than 2, preferably 2.1 or more, and more preferably 2.4 or more. The $W_1/W_2$ is preferably 10 or less and particularly preferably 6 or less, and may be 3 or less. These upper limit values and lower limit values may be optionally combined with each other. For example, the $W_1/W_2$ may be greater than 2 and 3 or less, or alternatively, 2.1 or more and 10 or less.

The $W_1$ is 1 to 8 parts by weight per 100 parts by weight of the positive electrode active material particles, preferably 1.2 to 7 parts by weight, and particularly preferably 2 to 5 parts by weight, or alternatively 1.3 to 3.5 parts by weight. By setting the $W_1$ within the above range, good boding between the positive electrode material mixture layer and the current collector can be readily maintained.

The amount of the binder per 100 parts by weight of the positive electrode active material particles at a midpoint between the position corresponding to the first maximum point and the current collector (i.e., the interface between the current collector and the positive electrode material mixture layer) is preferably 0.6 $W_1$ to 0.99 $W_1$, and more preferably 0.7 $W_1$ to 0.98 $W_1$. By controlling the amount of the binder as above, excessive deterioration in current-collecting ability can be suppressed.

The $W_2$ is 0.3 to 1.5 parts by weight per 100 parts by weight of the positive electrode active material particles, preferably 0.5 to 1.2 parts by weight, and more preferably 0.6 to 1.1 parts by weight. By setting the $W_2$ within the above range, the stress tends to be absorbed in the center area of the positive electrode material mixture layer in the thickness direction thereof, which can more effectively suppress the breakage of the positive electrode. In a positive electrode with high density, even if the amount of the binder in the center area is relatively small, sufficient adhesion can be maintained.

The second maximum point corresponds to a position nearer the surface (i.e., further away from the current collector) than the position corresponding to the minimum point in the positive electrode material mixture layer. The positive electrode material mixture layer having such a distribution contains a larger amount of binder in the area near the surface than in the center area. As such, falling-off of the positive electrode active material particles from the area near the surface in positive electrode material mixture layer can be suppressed.

In the present invention, the amount $W_3$ of the binder per 100 parts by weight of the positive electrode active material particles at the second maximum point is preferably smaller than the $W_1$. By controlling the amount of the binder as above, sufficient rate characteristics can be maintained.

The $W_3$ is preferably 1 to 5 parts by weight per 100 parts by weight of the positive electrode active material particles, more preferably 1 to 3 parts by weight, and particularly preferably 1.1 to 2.5 parts by weight. By setting the $W_3$ within the above range, falling-off of the positive electrode active material particles from the area near the surface in the positive electrode material mixture layer can be more effectively suppressed.

The graph showing a distribution of the binder in the positive electrode material mixture layer is a graph with the horizontal axis representing a distance "d" from the current collector in the thickness direction of the positive electrode material mixture layer, and the vertical axis representing a weight content (part(s) by weight) of the binder at the distance "d". In the graph, a bottom peak of the amount of binder which appears in the range corresponding to the center area in the positive electrode material mixture layer is defined as the minimum point. In the case where two or more bottom peaks appear in the center of the graph, a peak where the amount of binder is the smallest among these is defined as the minimum point. A top peak which appears in the range closer to the current collector than the position corresponding to the minimum point is defined as the first maximum point, and a top peak which appears further away from the current collector than the position corresponding to the minimum point is defined as the second maximum point. In the case where two or more top peaks appear in the range closer to the current collector than the position corresponding to the minimum point, a peak where the amount of binder is the largest among these is defined as the first maximum point. Likewise, in the case where two or more top peaks appear in the range further away from the current collector than the position corresponding to the minimum point, a peak where the amount of binder is the largest among these is defined as the second maximum point.

In the positive electrode material mixture layer according to the present invention, a straight line connecting the first maximum point and the minimum point preferably has a slope of not less than −0.3 part by weight/μm and not more than −0.05 part by weight/μm, and more preferably has a slope of not less than −0.2 part by weight/μm and −0.05 part by weight/μm. By allowing the positive electrode material mixture layer to have such a distribution of the binder, the balance between the thickness of the positive electrode material mixture layer and the distribution of the binder is enhanced. As a result, it becomes possible to realize achievement of a higher density, and suppression of the deterioration in current-collecting ability and the breakage of the positive electrode, in a well-balanced manner. If the positive electrode material mixture layer is too thick, since the first maximum point and the minimum point are too much apart from each other, the absolute value of the slope is decreased, and the distribution becomes broad, and therefore, the breakage of the positive electrode is less likely to be suppressed.

One exemplary method of checking the distributed state of the binder in the positive electrode material mixture layer is described.

On a cross section of the positive electrode, a measurement area including the current collector surface and the positive electrode material mixture layer surface is arbitrarily selected, and the measurement area is divided into 255×255 pixels (minute segments). A peak strength in each minute segment is measured by electron probe microanalyzer (EPMA) method. Specifically, the positive electrode was scanned with electron beams along the plane direction at an arbitrary position on the cross section in the thickness direction of the positive electrode (e.g., the position at a distance "d" from the current collector), to measure a peak strength in each of the minute segments, and the measured values are averaged. Similar measurements are performed along the thickness direction from the surface of the positive electrode material mixture layer on one side of the current collector to the surface of the current collector. From the signal intensity attributed to an element contained in the binder, a weight content (part(s) by weight) of the binder in the arbitrarily selected area is determined. The relationship between the signal intensity and the weight content of the binder can be determined from comparison with a calibration curve which had been obtained beforehand from a sample with a known weight content. The weight content (part(s) by weight) of the binder is plotted on the vertical axis, while the distance from the current collector in the thickness direction is plotted on the horizontal axis, whereby the distributed state of the binder in the positive electrode material mixture layer can be checked.

In EPMA method, a sample (herein, a cross section of the positive electrode in its thickness direction) is irradiated with accelerated electron beams, to detect a spectrum of characteristic X-rays. This is used to detect and identify elements present in the minute segment irradiated with electron beams, and analyze the percentage (concentration) of each element.

Hydrogen element cannot be detected by EMPA measurement. Moreover, it is difficult to identify carbon element contained in the binder because the conductive material also contains carbon element. For this reason, it is preferable to detect an element other than these, as an element correlated with the weight content of the binder. For example, in the case where the binder is a fluorocarbon resin, fluorine element, which is a constituent element thereof, is to be detected. The element correlated with the weight content of the binder may or may not be a constituent element of the binder. For example, the binder may be doped with an element that is easily detectable.

The positive electrode active material particles may be any positive electrode active material particles commonly used in the field of non-aqueous electrolyte secondary batteries. For example, the positive electrode active material may be a lithium-containing transition metal oxide. The lithium-containing transition metal oxide preferably has a layered or hexagonal crystal structure or a spinel structure. The transition metal element may be one or two or more elements selected from the group consisting of Co, Ni, and Mn. The element(s) in the transition metal may be partially replaced with a different element. Alternatively, the surface of the lithium-containing transition metal oxide particle may be coated with a different element. One or two or more elements selected from the group consisting of Na, Mg, Sc, Y, Fe, Cu, Zn, Al, Cr, Pb, Sb, and B may be used as the different element. These positive electrode active materials may be used singly or in combination of two or more.

Examples of the positive electrode active material include $Li_xCoO_2$, $Li_xNiO_2$, $Li_xMnO_2$, $Li_xCo_yNi_{1-y}O_2$, $Li_xCo_yM_{1-y}O_z$, $Li_xNi_{1-y}M_yO_z$, $Li_xMn_2O_4$, and $Li_xMn_{2-y}M_yO_4$, where M is at least one selected from Na, Mg, Sc, Y, Mn, Fe, Co, Ni, Cu, Zn, Al, Cr, Pb, Sb, and B. In the case where the positive electrode active material includes element M and another transition metal element (Ni, Co, or Mn), element M is usually an element different from that transition metal element. In the above general formulae, $0<x\leq1.2$, $0<y\leq0.9$, and $2\leq z\leq2.3$.

The binder may be any binder commonly used in the field of non-aqueous electrolyte secondary batteries, such as a fluorocarbon resin, olefinic resin, acrylic resin, or rubber-like resin (e.g., styrene-butadiene rubber). Among these, a fluorocarbon resin is preferred. Examples of the fluorocarbon resin include polytetrafluoroethylene (PTFE), polyvinylidene fluoride (PVDF), and a copolymer containing a vinylidene fluoride (VDF) unit (e.g., a copolymer containing a VDF unit and a hexafluoropropylene (HFP) unit). The content of the vinylidene fluoride unit in the copolymer is preferably 50 wt % or more of the total weight. These fluorocarbon resins preferably have a weight average molecular weight of 300,000 to 1,500,000. The amount of the binder contained in the whole positive electrode material mixture layer may be, for example, 0.9 to 4 parts by weight and, preferably, 1 to 3 parts by weight per 100 parts by weight of the positive electrode active material.

Examples of the conductive material include: carbon blacks, such as acetylene black and Ketjen black; and graphites. The amount of the conductive material contained in the positive electrode material mixture layer may be, for example, 0.5 to 5 parts by weight per 100 parts by weight of the positive electrode active material.

The positive electrode current collector may be, for example, a sheet or foil including a metal material such as aluminum or titanium.

The active material density of the positive electrode material mixture layer according to the present invention is 3.3 to 4 g/cm$^3$, and preferably 3.5 to 3.8 g/cm$^3$. By setting the active material density within the above range, a battery with high capacity can be obtained. In general, a positive electrode including a positive electrode material mixture layer having a high active material density easily generates stress in its interior and tends to easily break. However, by distributing the binder as above, the stress is readily suppressed, and the breakage of the positive electrode can be suppressed. The active material density of the positive electrode material mixture layer is a weight of the positive electrode active material particles per cm$^3$ of the positive electrode material mixture layer.

The porosity of the positive electrode material mixture layer is preferably 10 to 25%, and more preferably 15 to 21%. By setting the porosity within the above range, the breakage during winding can be more effectively suppressed, and it becomes advantageous in achieving a higher capacity of the battery. The porosity of the positive electrode material mixture layer can be determined from the weight and true density per unit area of each of the materials (e.g., the positive electrode active material, conductive material, and binder) included in positive electrode material mixture layer.

The positive electrode of the present invention can be produced by, for example, the following method.

(1) Preparation of Slurry

The distribution of the binder in the positive electrode material mixture layer can be controlled by applying two or more slurries which are different in the amount (usually, the weight content) of the binder relative to the amount of the positive electrode active material particles. A slurry is prepared by mixing positive electrode active material particles with a binder and a dispersion medium. Specifically, a first slurry to be applied onto a current collector, and a second slurry to be applied after application of the first slurry onto the film of the first slurry are used. Three or more slurries which are different in the weight content of the binder may be used in the present invention.

The weight content of the binder in each slurry may be adjusted as appropriate, depending on a desired distribution of the binder (e.g., $W_1/W_2$ or slope of a straight line connecting the first maximum point and the minimum point). For example, in the case of using two slurries to form a two-layer structure, an amount $w_1$ of the binder per 100 parts by weight of the positive electrode active material particles in the first slurry is preferably 1 to 8 parts by weight, and more preferably 2 to 5 parts by weight. An amount $w_2$ of the binder per 100 parts by weight of the positive electrode active material particles in the second slurry is preferably 0.1 to 3 parts by weight, and more preferably 0.5 to 1.5 parts by weight, or alternatively 0.5 to 1 part by weight.

In the case of using three slurries to form a three-layer structure, the amount $w_1$ of the binder per 100 parts by weight of the positive electrode active material particles in the first slurry is preferably 1 to 8 parts by weight, and more preferably 2 to 5 parts by weight. The amount $w_2$ of the binder per 100 parts by weight of the positive electrode active material particles in the second slurry is preferably 0.5 to 1.5 parts by weight, and more preferably 0.6 to 1 part by weight. An amount $w_3$ of the binder per 100 parts by weight of the positive electrode active material particles in a third slurry is preferably 1 to 3 party by weight, and more preferably 1.3 to 2.5 parts by weight, or alternatively 1.5 to 2.5 parts by weight.

A ratio $w_1/w_2$ of the amount $w_1$ of the binder per 100 parts by weight of the positive electrode active material particles in the first slurry to the amount $w_2$ of the binder per 100 parts by weight of the positive electrode active material particles in the second slurry is preferably greater than 2 and 10 or less, and more preferably greater than 2 and 6 or less. By using such slurries, a positive electrode material mixture layer in which the binder is favorably distributed can be obtained.

The dispersion medium may be, for example, water, an organic solvent such as N-methyl-2-pyrrolidone, or a mixed solvent of these.

(2) Production of Positive Electrode

The first slurry is applied onto a surface of the current collector, to form a first layer. While the film of the first slurry applied onto the surface of the current collector is drying, the migration of the binder in the first slurry occurs, and the binder moves toward the surface of the first layer. As a result, the distribution of the binder in the first layer becomes such that the amount of the binder increases with distance away from the surface of the current collector.

Thereafter, the second slurry is applied onto the surface of the first layer, to form a second layer. Similar migration occurs also in the film of the second slurry. However, part of the binder included in the first layer elutes into the solvent included in the second slurry, when the second slurry is applied. The eluted binder moves together with the binder included in the second slurry toward the surface of the second layer, during, for example, drying of the second slurry. Here, since the first layer includes a comparatively large amount of binder, much of the binder stays near the current collector. As a result, the distribution of the binder becomes such that, for example, the first maximum point appears within the first layer, the minimum point appears at a position further away from the current collector than the interface between the first and second layers, and the second maximum point appears near the surface of the second layer.

In the case of forming a third layer, the third slurry is further applied onto the surface of the second layer. In such a manner, the positive electrode material mixture layer is formed on a surface of the current collector. Each of the first, second and third slurries is preferably dried after application, for example, with hot air. The migration of binder can be controlled as desired by changing the drying conditions. The drying temperature is, for example, less than 150° C., preferably 80 to 130° C., and more preferably 90 to 125° C. The drying time may be selected as appropriate, depending on the drying temperature or the type of the dispersion medium.

The positive electrode material mixture layer is usually rolled after drying. The thickness of the positive electrode material mixture layer (or the thickness of each layer) and/or the active material density can be controlled by rolling.

The thickness of each layer may be adjusted as appropriate, depending on a desired distribution of the binder. For example, in the case of forming a two-layer structure, when the thickness of the positive electrode material mixture layer is denoted as T, and the thickness of the first layer is denoted as $T_1$, T and $T_1$ preferably satisfy $0.1\ T \le T_1 \le 0.4\ T$, and more preferably satisfy $0.15\ T \le T_1 \le 0.3\ T$. When the thickness of the second layer is denoted as $T_2$, T and $T_2$ preferably satisfy $0.6\ T \le T_2 \le 0.9\ T$, and more preferably satisfy $0.7\ T \le T_2 \le 0.85\ T$. By setting the thickness of each layer within the above range, the distribution of the binder can be readily controlled to a desired one.

By setting the thickness of the first layer $T_1$ to 0.4 T or less, the minimum point can be readily controlled to appear at a desired position. The thickness of the first layer may be, for example, 5 to 50 µm, and more preferably 10 to 20 µm. Such a range is advantageous in allowing a sufficient amount of binder to be distributed in the area near the current collector in the positive electrode material mixture layer. It also advantageous in that the minimum point is allowed to correspond to an appropriate position, while appearing of the minimum point at a position excessively apart from the current collector in the thickness direction of the positive electrode material mixture layer can be effectively suppressed. In this case, even if the positive electrode material mixture layer is separated around the minimum point, it is possible to more effectively prevent breakage in the area near the current collector in the positive electrode material mixture layer.

By setting the thickness of the second layer $T_2$ within the above range, the minimum point can be readily controlled to appear at a desired position. Further, it is advantageous in allowing a sufficient amount of binder to be distributed near the current collector in the positive electrode material mixture layer. The thickness of the second layer may be, for example, 10 to 100 µm, and more preferably 30 to 80 µm.

After the formation of the first layer and before the application of the second slurry, the current collector with the first layer formed thereon may be heated. Heating enhances the crystallinity of the binder included in first layer. Because of this, the elution of the binder included in the first layer into the second slurry, which occurs when the second slurry is applied, is suppressed. As a result, a positive electrode material mixture layer in which the binder is favorably distributed can be obtained. The heating temperature may be, for example, 150 to 250° C., and preferably 170 to 230° C.

In the case of forming a three-layer structure, when the thickness of the positive electrode material mixture layer is denoted as T, and the thickness of the first layer is denoted as $T_1$, T and $T_1$ preferably satisfy $0.1\ T \le T_1 \le 0.4\ T$, and more preferably satisfy $0.15\ T \le T_1 \le 0.3\ T$. This is because of the same reason as described above for the two-layer structure.

When the thickness of the second layer is denoted as $T_2$, T and $T_2$ preferably satisfy $0.05\ T \le T_2 \le 0.25\ T$, and more preferably satisfy $0.1\ T \le T_2 \le 0.2\ T$. When the thickness of the third layer is denoted as $T_3$, T and $T_3$ preferably satisfy $0.45\ T \le T_3 \le 0.85\ T$, and more preferably satisfy $0.55\ T \le T_3 \le 0.75\ T$.

By setting the thickness of the second layer $T_2$ within the above range, the minimum point can be readily controlled to appear at a desired position. The thickness of the second layer may be, for example, 5 to 25 µm, and more preferably 10 to 20 µm.

By setting the thickness of the third layer $T_3$ within the above range, the minimum point can be readily controlled to appear at a desired position. Further, advantageously, a sufficient amount of binder can be distributed in the area near the current collector in the positive electrode material mixture layer. The thickness of the third layer may be, for example, 10 to 100 µm, and more preferably 20 to 60 µm.

According to the method as described above, part of the binder included in the first layer elutes into the solvent included in the second slurry, when the second slurry is applied. Here, since the first layer includes a comparatively large amount of binder, much of the binder stays near the current collector. As a result, the distribution of the binder becomes such that the first maximum point appears within the first layer, the minimum point appears around the second layer, and the second maximum point appears near the surface of the third layer.

A non-aqueous electrolyte secondary battery includes the above-described positive electrode, a negative electrode, a separator interposed between the positive electrode and the negative electrode, and a non-aqueous electrolyte. The positive electrode, the negative electrode, and the separator are wound together, forming an electrode group.

The negative electrode includes a current collector, and a negative electrode material mixture layer formed on a surface of the current collector. The negative electrode material mixture layer includes negative electrode active material particles, and a binder as an essential component, and further includes, for example, a thickener and a conductive material as optional components.

Examples of the negative electrode active material include carbon materials such as graphite particles, materials containing Si, and materials containing Sn. Particles including a region having a graphite structure may be used as the graphite particles, examples of which include natural graphite particles, artificial graphite particles, and graphitized mesophase carbon particles. Examples of the materials containing Si include simple substance Si, Si-containing alloys, and $SiO_{m1}$, where $0 < m1 < 2$. Examples of the materials containing Sn include simple substance Sn, Sn-containing alloys, and $SiO_{m2}$, where $0 < m2 < 2$.

These negative electrode active materials may be used singly or in combination of two or more.

Examples of the binder include various binders exemplified as the binder for the positive electrode material mixture layer.

Examples of the thickener include carboxymethyl cellulose (CMC).

Examples of the current collector for the negative electrode include a sheet or foil including copper or nickel.

The non-aqueous electrolyte includes a non-aqueous solvent and a solute dissolved therein. Examples of the non-aqueous solvent include cyclic carbonic acid esters, chain carbonic acid esters, and cyclic carboxylic acid esters. The cyclic carbonic acid esters are exemplified by ethylene carbonate (EC), and propylene carbonate (PC). The chain carbonic acid esters are exemplified by diethyl carbonate (DEC), ethyl methyl carbonate (EMC), and dimethyl carbonate (DMC). The cyclic carboxylic acid esters are exemplified by γ-butyrolactone (GBL), and γ-valerolactone (GVL). These non-aqueous solvents may be used singly or in combination of two or more.

Examples of the solute include, without limitation, inorganic lithium fluorides and lithium imide compounds. The inorganic lithium fluorides are exemplified by $LiPF_6$ and $LiBF_4$, and the lithium imide compounds are exemplified by $LiN(CF_3SO_2)_2$.

The separator may be a conventionally used one being a microporous film made of, for example, polyethylene or polypropylene. The thickness of the separator is, for example, 10 to 30 μm.

The present invention is specifically described below with reference to Examples and Comparative Examples, but should not be construed as limited by the following Examples.

EXAMPLES

Example 1

(i) Production of Positive Electrode (First Layer)

$LiCoO_2$ serving as a positive electrode active material was mixed in an amount of 100 parts by weight with 2 parts by weight of polyvinylidene fluoride (PVDF, KF polymer L 7208 available from Kureha Corporation) serving as a binder, 3 parts by weight of acetylene black serving as a conductive material, and an appropriate amount of N-methyl-2-pyrrolidone (NMP) serving as a dispersion medium, to prepare a first slurry with solid content of 73 wt %. The first slurry was applied onto both surfaces of a current collector made of a 15-μm-thick aluminum foil, and dried at 110° C. for 5 minutes, to form first layers.

(Second Layer)

The same positive electrode active material as that used for the first layer was mixed in an amount of 100 parts by weight with 1 part by weight of PVDF serving as a binder, 3 parts by weight of acetylene black serving as a conductive material, and an appropriate amount of NMP serving as a dispersion medium, to prepare a second slurry with solid content of 78 wt %. The second slurry was applied onto the surface of each of the first layers, and dried at 110° C. for 5 minutes, to form second layers.

The applied films were rolled between rollers, so that the active material density of the positive electrode material mixture layer reached 3.55 g/cm³, to prepare a positive electrode sheet. After rolling, the thickness of the first layer was about 15 μm, the thickness of the second layer was about 40 μm, and the overall thickness of the sheet was 125 μm. Thereafter, the positive electrode sheet was cut in the size of 55 mm wide and 500 mm long, to give a positive electrode.

(ii) Production of Negative Electrode

Flake graphite serving as a negative electrode active material was mixed in an amount of 100 parts by weight with 2 parts by weight of styrene-butadiene copolymer (SBR, BM-400B available from Zeon Corporation, Japan) serving as a binder, 1 part by weight of carboxymethyl cellulose (CMC) serving as a thickener, and an appropriate amount of water serving as a dispersion medium, to prepare a negative electrode material mixture slurry. The negative electrode material mixture slurry was applied onto a negative electrode current collector made of a 10-μm-thick copper foil, and dried at 60° C. for 5 minutes, to form a negative electrode material mixture layer on a surface of the negative electrode current collector. Thereafter, the applied film was rolled between rollers, so that the overall thickness of the negative electrode reached 150 μm, to prepare a negative electrode sheet. The negative electrode sheet was cut in the size of 58 mm wide and 540 mm long, to give a negative electrode.

(iii) Preparation of Non-Aqueous Electrolyte $LiPF_6$ was dissolve at a concentration of 1 mol/L in a non-aqueous solvent containing ethylene carbonate (EC) and ethyl methyl carbonate (EMC) in a ratio of 1:3 by volume, to prepare a non-aqueous electrolyte.

(iv) Production of Battery

A non-aqueous electrolyte secondary battery as shown in FIG. 2 was produced in the following manner.

One end of a positive electrode lead 5a was connected to an exposed portion of the positive electrode current collector, and one end of a negative electrode lead 6a was connected to an exposed portion of the negative electrode current collector. A positive electrode 5 and a negative electrode 6 were wound with a separator 7 made of a 20-μm-thick polypropylene microporous film interposed therebetween, around a winding core of 3 mm in outer diameter, to form an electrode group.

The electrode group was sandwiched between an upper insulating ring 8a and a lower insulating ring 8b, and inserted into a cylindrical battery case 1 of 18 mm in outer diameter and 65 mm in length. The other end of the negative electrode lead 6a was welded to the inner bottom surface of the battery case 1. The non-aqueous electrolyte was injected into the battery case 1, and was allowed to impregnate into the electrode group by a pressure reduction method.

The other end of the positive electrode lead 5a was welded to the undersurface of a sealing member 2. The battery case 1 was sealed with the sealing member 2 with a gasket 3 interposed therebetween. A cylindrical lithium ion secondary battery was thus produced.

Example 2

A battery was produced in the same manner as in Example 1, except that, in the first slurry, the amount of binder was changed to 3 parts by weight, and the solid content was changed to 68 wt %.

Example 3

A battery was produced in the same manner as in Example 1, except that, in the first slurry, the amount of binder was changed to 4 parts by weight, and the solid content was changed to 60 wt %.

Example 4

A battery was produced in the same manner as in Example 3, except that the positive electrode with the first layers formed thereon was heated at 190° C. for 30 minutes, and then, the second layers were formed on the first layers.

Example 5

A battery was produced in the same manner as in Example 4, except that, in the first slurry, the amount of binder was changed to 5 parts by weight, and the solid content was changed to 58 wt %.

Example 6

A battery was produced in the same manner as in Example 4, except that, in the first slurry, the amount of binder was changed to 7 parts by weight, and the solid content was changed to 50 wt %.

Example 7

(i) Production of Positive Electrode (First Layer)

$LiCoO_2$ serving as a positive electrode active material was mixed in an amount of 100 parts by weight with 4 parts by weight of PVDF serving as a binder, 3 parts by weight of acetylene black serving as a conductive material, and an appropriate amount of NMP serving as a dispersion medium, to prepare a first slurry with solid content of 62 wt %. The first slurry was applied onto both surfaces of the same current collector as that used in Example 1, and dried at 110° C. for 5 minutes, to form first layers.

(Second Layer)

The same positive electrode active material as that used for the first layer was mixed in an amount of 100 parts by weight with 0.7 part by weight of PVDF serving as a binder, 3 parts by weight of acetylene black serving as a conductive material, and an appropriate amount of NMP serving as a dispersion medium, to prepare a second slurry with solid content of 78 wt %. The second slurry was applied onto the surface of each of the first layers, and dried at 110° C. for 5 minutes, to form second layers.

(Third Layer)

The same positive electrode active material as that used for the first layer was mixed in an amount of 100 parts by weight with 1.5 parts by weight of PVDF serving as a binder, 3 parts by weight of acetylene black serving as a conductive material, and an appropriate amount of NMP serving as a dispersion medium, to prepare a third slurry with solid content of 73 wt %. The third slurry was applied onto the surface of each of the second layers formed on both sides, and dried at 110° C. for 5 minutes, to form third layers.

The applied films were rolled between rollers, so that the active material density of the positive electrode material mixture layer reached 3.55 g/cm³, to prepare a positive electrode sheet. After rolling, the thickness of the first layer was about 15 μm, the thickness of the second layer was about 10 μm, the thickness of the third layer was about 30 μm, and the overall thickness of the sheet was 125 μm. Thereafter, the positive electrode sheet was cut in the size of 55 mm wide and 500 mm long, to give a positive electrode.

A battery was produced in the same manner as in Example 1 except that the positive electrode thus obtained was used.

Comparative Example 1

$LiCoO_2$ serving as a positive electrode active material was mixed in an amount of 100 parts by weight with 2 parts by weight of PVDF serving as a binder, 3 parts by weight of acetylene black serving as a conductive material, and an appropriate amount of NMP serving as a dispersion medium, to prepare a positive electrode material mixture with solid content of 73 wt %. The positive electrode material mixture slurry was applied onto both surfaces of the same positive electrode current collector as that used in Example 1, and dried at 110° C. for 5 minutes, to form positive electrode material mixture layers. Neither a second layer nor a third layer was formed.

The applied films were rolled between rollers, so that the active material density of the positive electrode material mixture layer reached 3.55 g/cm³, to prepare a positive electrode sheet. After rolling, the overall thickness of the sheet was 125 μm. Thereafter, the positive electrode sheet was cut in the size of 55 mm wide and 500 mm long, to give a positive electrode.

A battery was produced in the same manner as in Example 1 except that the positive electrode thus obtained was used.

Comparative Example 2

A battery was produced in the same manner as in Example 4, except that, in the first slurry, the amount of the binder was changed to 10 parts by weight, and the solid content was changed to 40 wt %.

Comparative Example 3

A battery was produced in the same manner as in Example 1, except that, in the second slurry, the amount of the binder was changed to 1.5 parts by weight, and the solid content was changed to 73 wt %.

Comparative Example 4

(i) Production of Positive Electrode (First Layer)

$LiCoO_2$ serving as a positive electrode active material was mixed in an amount of 100 parts by weight with 4 parts by weight of PVDF serving as a binder, 3 parts by weight of acetylene black serving as a conductive material, and an appropriate amount of NMP serving as a dispersion medium, to prepare a first slurry with solid content of 60 wt %. The first slurry was applied onto both surfaces of the same current collector as that used in Example 1, and dried at 110° C. for 5 minutes, to form first layers.

(Second Layer)

The same positive electrode active material as that used for the first layer was mixed in an amount of 100 parts by weight with 1 part by weight of PVDF serving as a binder, 3 parts by weight of acetylene black serving as a conductive material, and an appropriate amount of NMP serving as a dispersion medium, to prepare a second slurry with solid content of 78 wt %. The second slurry was applied onto the surface of each of the first layers, and dried at 110° C. for 5 minutes, to form second layers.

(Third Layer)

The same positive electrode active material as that used for the first layer was mixed in an amount of 100 parts by weight with 0.5 part by weight of PVDF serving as a binder, 3 parts by weight of acetylene black serving as a conductive material, and an appropriate amount of NMP serving as a dispersion medium, to prepare a third slurry with solid content of 78 wt %. The third slurry was applied onto the surface of each of the second layers formed on both sides, and dried at 110° C. for 5 minutes, to form third layers.

The applied films were rolled between rollers, so that the active material density of the positive electrode material mixture layer reached 3.55 g/cm³, to prepare a positive electrode sheet. After rolling, the thickness of the first layer was about 15 μm, the thickness of the second layer was about 20 μm, the thickness of the third layer was about 20 μm, and the overall thickness of the sheet was 125 μm. Thereafter, the positive electrode sheet was cut in the size of 55 mm wide and 500 mm long, to give a positive electrode.

A battery was produced in the same manner as in Example 1 except that the positive electrode thus obtained was used.

Comparative Example 5

A battery was produced in the same manner as in Example 1, except that: in the first slurry, the amount of binder was changed to 10 parts by weight, and the solid content was changed to 40 wt %; and in the second slurry, the amount of binder was changed to 5 parts by weight, and the solid content was changed to 58 wt %.

Table 1 shows the layer configuration of the positive electrode in each of the batteries of Examples 1 to 7 and Comparative Example 1 to 5. Here, in Table 1, the "amount of binder" refers to an amount of the binder (part(s) by weight) per 100 parts by weight of the positive electrode active material particles in the slurry used for forming each layer.

TABLE 1

|  | First layer | | | Second layer | | Third layer | |
| --- | --- | --- | --- | --- | --- | --- | --- |
|  | Amount of binder (pts. wt.) | Thickness (μm) | Heating at 190° C. | Amount of binder (pts. wt.) | Thickness (μm) | Amount of binder (pts. wt.) | Thickness (μm) |
| Ex. 1 | 2 | 15 | without | 1 | 40 | — | — |
| Ex. 2 | 3 | 15 | without | 1 | 40 | — | — |
| Ex. 3 | 4 | 15 | without | 1 | 40 | — | — |
| Ex. 4 | 4 | 15 | with | 1 | 40 | — | — |
| Ex. 5 | 5 | 15 | with | 1 | 40 | — | — |
| Ex. 6 | 7 | 15 | with | 1 | 40 | — | — |
| Ex. 7 | 4 | 15 | without | 0.7 | 10 | 1.5 | 30 |
| Com. Ex. 1 | 2 | 55 | without | — | — | — | — |
| Com. Ex. 2 | 10 | 15 | with | 1 | 40 | — | — |
| Com. Ex. 3 | 2 | 15 | without | 1.5 | 40 | — | — |
| Com. Ex. 4 | 4 | 15 | without | 1 | 20 | 0.5 | 20 |
| Com. Ex. 5 | 10 | 15 | without | 5 | 40 | — | — |

[Evaluation]

The non-aqueous electrolyte secondary batteries produced in Examples 1 to 7 and Comparative Examples 1 to 5 were subjected to the following evaluation.

(Analysis of Distribution of Binder in Positive Electrode Material Mixture Layer)

The positive electrode of each of Examples and Comparative Examples was cut in 2×2 cm square, and coated with an epoxy resin, which was then cured. The cured sample was cross-sectioned and polished using a grinder, to expose a cross section of the positive electrode in its thickness direction. This is followed by analysis of a distribution of the binder using a wavelength dispersion-type electron probe microanalyzer (EPMA, JXA-8900 available from JEOL Ltd.). The similar analysis was performed by scanning along the plane of the positive electrode, to measure an amount (part(s) by weight) of the binder per 100 parts by weight of the positive electrode active material particles in each plane, and the measured values were averaged. The average value thus calculated of the amount of the binder was plotted on the vertical axis, and the distance of each plane from the current collector was plotted on the horizontal axis, to draw a graph. An amount $W_1$ of the binder at the first maximum point, an amount $W_2$ of the binder at the minimum point, an amount $W_3$ of the binder at the second maximum point, a $W_1/W_2$, and a slope of a straight line connecting the first maximum point and the minimum point were determined. The results are shown in Table 2.

(Peel Test)

The positive electrode material mixture layer on one side of the positive electrode was removed, and this positive electrode was cut into a strip of 15 mm in width and 100 mm in length. The strip was adhered with a double-sided tape onto a mount capable of horizontally moving the remaining positive electrode material mixture layer, and then, an end portion of the current collector was held with the chuck of a push-pull tester and was pulled upward by 90°, to perform a peel test.

The positive electrode after the peel test was observed to check whether or not the current collector was exposed therefrom, whereby the adhesion between the current collector and the positive electrode material mixture layer was evaluated. The results are shown in Table 2.

(Defect in Winding)

The positive electrode, negative electrode and separator were wound around a winding core of 3 mm in outer diameter, to form an electrode group, which was then disassembled. The positive electrode was observed to check whether or not the positive electrode current collector was broken or not. For each of Examples and Comparative Examples, 50 electrode groups were checked, and the number of broken electrode groups was counted. The results are shown in Table 2.

(Occurrence of Falling-Off of Positive Electrode Active Material Particles)

Whether or not the positive electrode active material particles fell off from the area near the surface in the positive electrode material mixture layer in the production process of the battery was checked visually. The results are shown in Table 2.

TABLE 2

|  | $W_1$ (pts. wt.) | $W_2$ (pts. wt.) | $W_3$ (pts. wt.) | $W_1/W_2$ | First maximum point Distance from current collector/μm | Slope (pts. wt./μm) | Exposure of current collector | Breakage of electrode | Falling-off of material mixture |
| --- | --- | --- | --- | --- | --- | --- | --- | --- | --- |
| Ex. 1 | 1.3 | 0.6 | 1.3 | 2.2 | 2 | −0.05 | Not exposed | 0 | Not occurred |
| Ex. 2 | 2.2 | 1.0 | 2 | 2.2 | 2 | −0.06 | Not exposed | 0 | Not occurred |

TABLE 2-continued

| | $W_1$ (pts. wt.) | $W_2$ (pts. wt.) | $W_3$ (pts. wt.) | $W_1/W_2$ | First maximum point Distance from current collector/μm | Slope (pts. wt./μm) | Exposure of current collector | Breakage of electrode | Falling-off of material mixture |
|---|---|---|---|---|---|---|---|---|---|
| Ex. 3 | 2.8 | 1.1 | 2.2 | 2.5 | 3 | −0.08 | Not exposed | 0 | Not occurred |
| Ex. 4 | 4.0 | 1.0 | 2.0 | 4 | 3 | −0.14 | Not exposed | 1 | Not occurred |
| Ex. 5 | 5.0 | 1.0 | 2.0 | 5 | 2 | −0.2 | Not exposed | 1 | Not occurred |
| Ex. 6 | 6.6 | 1.1 | 2.2 | 6 | 3 | −0.3 | Not exposed | 2 | Not occurred |
| Ex. 7 | 2.7 | 1.2 | 2.5 | 2.3 | 3 | −0.07 | Not exposed | 1 | Not occurred |
| Com. Ex. 1 | None | None | None | — | — | — | Exposed | 13 | Not occurred |
| Com. Ex. 2 | 9.1 | 1.6 | 2.9 | 5.7 | 3 | −0.4 | Not exposed | 7 | Not occurred |
| Com. Ex. 3 | 1.5 | 0.9 | 2.7 | 1.7 | 4 | −0.03 | Not exposed | 11 | Not occurred |
| Com. Ex. 4 | 2.6 | 1.3 | None | 2 | 3 | −0.07 | Not exposed | 2 | Occurred |
| Com. Ex. 5 | 8.1 | 5.2 | 7.1 | 1.6 | 7 | −0.15 | Not exposed | 39 | Not occurred |

A detail description is given below with regard to the obtained results.

In Examples 1 to 3, the amount of the binder in the first and second slurries was varied. In these Examples, a positive electrode material mixture layer having a favorable distribution of the binder was obtained.

In Examples 4 to 6, the formation of first layers was followed by heating, and then second layers were formed on the first layers. Heating enhances the crystallinity of the binder included in first layer. Accordingly, the elution of the binder included in the first layer into the second slurry was suppressed, and presumably because of this, a positive electrode material mixture layer having a favorable distribution of the binder was obtained.

In Example 7, first, second, and third layers were formed. Presumably because of this, a positive electrode material mixture layer having a favorable distribution of the binder was obtained.

In the peel test, in Examples 1 to 7 and Comparative Examples 2 to 5, almost no exposure of the current collector was observed, and the adhesion between the positive electrode material mixture layer and the current collector was maintained. This is presumably because the amount of the binder was comparatively large in the area near the current collector in the positive electrode material mixture layer. On the other hand, in Comparative Example 1, the positive electrode material mixture layer was left unpeeled in places, and the current collector was exposed.

In Examples 1 to 7, in which the $W_1/W_2$ was greater than 2, the breakage of the positive electrode was suppressed. In the batteries of Examples 1 to 7, the distribution of the binder was particularly favorable. Presumably because of this, gaps were formed or misalignment occurred around the minimum point in the center area of the positive electrode material mixture layer, whereby the stress generated during winding was reduced.

In Comparative Examples 1 to 3 and 5, the number of broken positive electrodes was large. Particularly in Comparative Example 5, it is considered that the concentration of the binder in the center area was increased excessively, and the adhesion between the active material particles became too high. This made it difficult to reduce the stress in the positive electrode with high density, resulting in a large number of broken electrodes.

In Comparative Example 4, although the number of broken positive electrodes was small, falling-off of the positive electrode active material particles from the area near the surface in the positive electrode material mixture layer was observed. This is presumably because the amount of the binder in the area near the surface was small.

The results of Examples 1 to 5 and 7 show that setting the slope of a straight line connecting the first maximum point and the minimum point to not less than −0.3 part by weight/μm and not more than −0.05 part by weight/μm can provide a battery in which the breakage of the positive electrode is suppressed.

INDUSTRIAL APPLICABILITY

According to the present invention, the breakage of the positive electrode during winding can be suppressed, and therefore, the productivity of non-aqueous electrolyte secondary batteries can be improved. Therefore, it is useful as a power source suitable for reduction in size and weight of electronic devices such as cellular phones and notebook personal computers.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

REFERENCE SIGNS LIST

1 Battery case
2 Sealing member
3 Gasket
4 Positive electrode
5a Positive electrode lead
6 Negative electrode 6a Negative electrode lead
7 Separator
8a Upper insulating ring
8b Lower insulating ring

The invention claimed is:

1. A positive electrode for non-aqueous electrolyte secondary batteries, the positive electrode comprising a current collector and a positive electrode material mixture layer formed on a surface of the current collector, wherein:
the positive electrode material mixture layer includes positive electrode active material particles and a binder;
the positive electrode material mixture layer has, in a thickness direction thereof, an area $A_1$ near the current collector, an area $A_2$ near a surface of the positive electrode material mixture layer, and a center area $A_3$ excluding the area $A_1$ and the area $A_2$,
the area $A_1$ has a thickness of 0.3T as measured from the current collector, and the area $A_2$ has a thickness of 0.3T as measured from the surface of the positive electrode material mixture layer, when a thickness of the positive electrode material mixture layer is denoted as T;
when distances from the current collector at a plurality of positions in the thickness direction are plotted against amounts of the binder in the positions to show a plot between the distances and the amounts, the plot has a first maximum point, a minimum point, and a second maximum point;
the minimum point corresponds to a position in the center area $A_3$;
the first maximum point corresponds to a position nearer the current collector than the position corresponding to the minimum point in the positive electrode material mixture layer;
the second maximum point corresponds to a position further away from the current collector than the position corresponding to the minimum point in the positive electrode material mixture layer;
a ratio $W_1/W_2$ of an amount $W_1$ of the binder per 100 parts by weight of the positive electrode active material particles at the first maximum point to an amount $W_2$ of the binder per 100 parts by weight of the positive electrode active material particles at the minimum point is greater than 2;
the $W_1$ is 1 to 8 parts by weight;
the $W_2$ is 0.3 to 1.5 parts by weight;
the positive electrode active material particles include a lithium-containing transition metal oxide;
the positive electrode material mixture layer has an active material density of 3.3 to 4 $g/cm^3$,
the positive electrode material mixture layer has a thickness of 20 to 150 μm; and
the first maximum point corresponds to a position at a distance of 1 to 5 μm from the current collector in the positive electrode material mixture layer in the thickness direction thereof.

2. The positive electrode for non-aqueous electrolyte secondary batteries in accordance with claim 1, wherein the binder includes a fluorocarbon resin.

3. The positive electrode for non-aqueous electrolyte secondary batteries in accordance with claim 1, wherein an amount of the binder per 100 parts by weight of the positive electrode active material particles at a midpoint between the position corresponding to the first maximum point and the current collector is 0.6 $W_1$ to 0.99 $W_1$.

4. The positive electrode for non-aqueous electrolyte secondary batteries in accordance with claim 1, wherein when a straight line connecting the first maximum point and the minimum point is drawn in the plot, a slope of the straight line is not less than −0.3 part by weight/μm and not more than −0.05 part by weight/μm.

5. The positive electrode for non-aqueous electrolyte secondary batteries in accordance with claim 1, wherein an amount $W_3$ of the binder per 100 parts by weight of the positive electrode active material particles at the second maximum point is smaller than the $W_1$.

6. A non-aqueous electrolyte secondary battery comprising: the positive electrode of claim 1; a negative electrode; a separator interposed between the positive electrode and the negative electrode; and a non-aqueous electrolyte, the positive electrode, the negative electrode, and the separator being wound together, forming an electrode group.

7. The positive electrode for non-aqueous electrolyte secondary batteries in accordance with claim 1, wherein
the $W_1$ is 1.2 to 7 parts by weight,
the $W_2$ is 0.5 to 1.2 parts by weight, and
the ratio $W_1/W_2$ is 2.1 or more and 10 or less.

8. The positive electrode for non-aqueous electrolyte secondary batteries in accordance with claim 1, wherein the positive electrode material mixture layer further includes a conductive material, and
an amount of the conductive material is 0.5 to 5 parts by weight per 100 parts by weight of the positive electrode active material particles.

9. The positive electrode for non-aqueous electrolyte secondary batteries in accordance with claim 1, wherein an amount of the binder contained in the whole positive electrode material mixture layer is 0.9 to 4 parts by weight per 100 parts by weight of the positive electrode active material particles.

* * * * *